(12) United States Patent
Putha et al.

(10) Patent No.: US 12,299,887 B1
(45) Date of Patent: May 13, 2025

(54) SYSTEM AND METHOD FOR CLASSIFYING FRACTURES AND BODY PARTS ON MUSCULOSKELETAL X-RAY IMAGE

(71) Applicant: Qure.ai Technologies Private Limited, Maharashtra (IN)

(72) Inventors: Preetham Putha, Maharashtra (IN); Swetha Tanamala, Maharashtra (IN); Sahil Sahil, Maharashtra (IN); Ravi Kumar Kushawaha, Maharashtra (IN)

(73) Assignee: Qure.ai Technologies Private Limited, Mumbai (IN)

( * ) Notice: Subject to any disclaimer, the term of this patent is extended or adjusted under 35 U.S.C. 154(b) by 0 days.

(21) Appl. No.: 18/935,765

(22) Filed: Nov. 4, 2024

(30) Foreign Application Priority Data

Nov. 3, 2023 (IN) .............................. 202321075162

(51) Int. Cl.
*G06T 7/00* (2017.01)
*G06V 10/764* (2022.01)
(Continued)

(52) U.S. Cl.
CPC .......... *G06T 7/0012* (2013.01); *G06V 10/764* (2022.01); *G06V 10/82* (2022.01);
(Continued)

(58) Field of Classification Search
None
See application file for complete search history.

(56) References Cited

U.S. PATENT DOCUMENTS 8,538,117 B2    9/2013  Najarian et al.
11,164,045 B2   11/2021 Paik et al.
(Continued)

FOREIGN PATENT DOCUMENTS

CN    108171714 B    9/2021
CN    112598661 B    7/2022
CN    113610809 B    4/2024

OTHER PUBLICATIONS

Olczak, Jakub, et al. "Artificial intelligence for analyzing orthopedic trauma radiographs: deep learning algorithms—are they on par with humans for diagnosing fractures ?. " Acta orthopaedica 88.6 (2017): 581-586. (Year: 2017).*

*Primary Examiner* — Samah A Beg

(57) ABSTRACT

An invention relates to a system (100) for classifying presence of fracture and body parts on musculoskeletal X-ray. The system (100) is based on an artificial intelligence for targeting fracture classification and body part. Further, the system comprises a data collection module (205) and a fracture classification module (206). Furthermore, the fracture classification module (206) may comprise a classification model (207) and a segmentation model (208). The classification model (207) may be configured to generate a classification score and the segmentation model (208) may be configured to generate segmentation score. The fracture classification module (206) may be configured to generate a fracture score (403) and a body part score (404). The fracture classification module (206) may be configured to compare said scores (403, 404) against threshold values to classify fracture presence and classify body parts. The system (100) may enhance the efficiency and accuracy of fracture diagnosis in X-ray images.

10 Claims, 5 Drawing Sheets

(51) Int. Cl.
*G06V 10/82* (2022.01)
*G06V 40/10* (2022.01)
(52) U.S. Cl.
CPC .... *G06V 40/10* (2022.01); *G06T 2207/10116* (2013.01); *G06T 2207/20081* (2013.01); *G06T 2207/20084* (2013.01); *G06T 2207/30008* (2013.01); *G06T 2207/30196* (2013.01); *G06V 2201/033* (2022.01)

(56) References Cited

U.S. PATENT DOCUMENTS

| | | |
|---|---|---|
| 11,315,242 B2 | 4/2022 | Katouzian et al. |
| 2021/0217166 A1* | 7/2021 | Graule .................. G16H 50/70 |

* cited by examiner

SYSTEM AND METHOD FOR CLASSIFYING FRACTURES AND BODY PARTS ON MUSCULOSKELETAL X-RAY IMAGE

CROSS REFERENCE TO RELATED APPLICATIONS

The present application claims the benefit of Indian Patent Application number 202321075162 filed on Nov. 3, 2023, the contents of which are incorporated herein by reference in their entirety.

TECHNICAL FIELD

The present subject matter described herein, in general, relates to a field of medical image processing. More specifically, the present invention relates to classification of fracture. More particularly, the present invention relates to the classification of presence of fracture and body parts on a musculoskeletal X-ray image using artificial intelligence techniques.

BACKGROUND

This section is intended to introduce the reader to various aspects of art, which may be related to various aspects of the present disclosure that are described or claimed below. This discussion is believed to be helpful in providing the reader with background information to facilitate a better understanding of the various aspects of the present disclosure. Accordingly, it should be understood that these statements in this background section are to be read in this light, and not as admissions of prior art. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Fractures are common injuries in patients of all age groups, often resulting from accidents, sports activities, falls and underlying medical conditions like osteoporosis. Timely and accurate fracture classification in patients is crucial for appropriate treatment and management.

Traditionally, medical imaging techniques, such as computed topography (CT) and X-ray imaging, have been the cornerstone for identifying fractures. Conventional X-ray radiography is still a valuable tool in fracture classification. Further, computed tomography (CT) and magnetic resonance imaging (MRI) techniques have improved the accuracy of fracture classification. Such diagnostic techniques are known to necessarily require highly skilled medical professionals, radiologists. Further, conventional instruments used for the diagnostic techniques require appropriate set up, assembling, and operational skills to be worked upon. The medical imaging techniques assist in diagnosis as well as treatment of medical conditions. It is well known that obtaining an X-ray requires at least skilled medical professionals, a lab facility, or a diagnostic centre. Further, an interpretation of the X-ray report requires skilled professionals such as radiologists and doctors as well. Typically, non-clinicians such as nurses, physiotherapists, health care providers and patients are not trained and equipped to perform the conventional diagnostic techniques. It may be understood that consulting a doctor, seeking an appointment for conventional X-ray, undergoing the X-ray procedure, procuring the X-ray reports, and then getting the X-ray reports interpreted by doctors, radiologists and the like may become a time-consuming process. Further, there is a possibility of partial diagnosis or an incomplete diagnosis if the X-ray image is not interpreted accurately. Therefore, these methods are complex and time-consuming making them less suitable for rapid diagnosis and point-of-care applications.

Hence, early and precise diagnosis is crucial to ensure appropriate medical intervention, reduce patient pain and suffering, and prevent complications.

Artificial intelligence (AI) has revolutionized the healthcare industry by enabling the analysis of patient data, whether in the form of text or medical images. While AI has made significant strides in image recognition, the precise identification of fractures, especially in complex anatomical structures or when subtle fractures are involved, remains a challenge. Conventional systems may miss subtle fractures or misclassify the fractures, body parts particularly in complex cases.

The diversity in the presentation of fractures, including variations in size, location, and severity, poses a formidable hurdle. The existing AI models often struggle to generalize effectively across this spectrum, leading to false positives or negatives, and further leading to misdiagnosis or missed fractures. Hence, interpreting complex X-ray images accurately, especially in cases with subtle or unconventional fracture patterns, remains a challenge. The AI system must be able to classify the presence of fracture and body parts even when they do not conform to standard patterns.

Additionally, the robustness of these systems to handle variations in X-ray image quality, positioning, and patient demographics is a concern. Real-world X-ray images can exhibit substantial variability. Therefore, there is a need for an improved system which performs consistently and accurately under such conditions.

Therefore, there is a long-standing need for an improved system and method for classifying the presence of fracture and body parts on a musculoskeletal X-ray image, to overcome the above-mentioned problems.

SUMMARY

Before the present system and method are described, it is to be understood that this disclosure is not limited to the system and its arrangement as described, as there can be multiple possible embodiments which are not expressly illustrated in the present disclosure. The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

It is also to be understood that the terminology used in the description is for the purpose of describing the versions or embodiments only and is not intended to limit the scope of the present application.

This summary is not intended to identify essential features of the claimed subject matter nor is it intended for use in classifying or limiting the scope of the claimed subject matter. In one implementation, a system for classifying fractures and body parts on a musculoskeletal X-ray image is disclosed. In one embodiment, the system may comprise a memory and a processor. The processor may be coupled with the memory. The processor may be configured to execute programmed instructions stored in the memory. Further, the system may comprise a data collection module.

The data collected by the data collection module may correspond to an input X-ray image. The system may further comprise a fracture classification module for classifying the presence of fracture and body parts based on the collected data, using a classification model and a segmentation model based on an artificial intelligence. Furthermore, the classification model and the segmentation model may be carried out by the processor. The classification model may be configured to perform a step of analyzing the input X-ray image to recognize a plurality of tags, wherein the plurality of tags includes a fracture and a plurality of body parts. The classification model may be configured to perform a step of calculating a classification score, corresponding to the recognition of a plurality of tags. Further, the segmentation model may be configured to perform a step of dividing the input X-ray image into a plurality of pixels to determine a probability of fracture for each pixel of the plurality of pixels. Further, the segmentation model may be configured to perform a step for calculating a segmentation score for each pixel of the plurality of pixels, corresponding to the probability of fracture. The fracture classification module may be configured for generating a fracture score and a body part score based on the classification score and the segmentation score. The fracture classification module may be configured for comparing the fracture score with a threshold value for a fracture to classify presence of fracture and comparing the body part score with a threshold value for each body part to classify body part.

In one embodiment, the system may comprise a report generation module to generate a fracture classification report. The fracture classification report may comprise information of the presence of fracture and body parts.

In another embodiment, the fracture classification module may be configured to train the classification model and the segmentation model using data collected by the data collection module.

In yet another embodiment, the fraction classification model may correspond to a deep learning algorithm.

In yet another embodiment, the deep learning algorithm may be a convolution neural network (CNN).

In yet another embodiment, the classification model and the segmentation model may be trained using one of an EfficientNet, a U-Net, and a combination thereof, based neural network.

In yet another embodiment, the body part may at least one of a group comprising ankle, leg, clavicle, femur, fibula tibia, wrist, forearm, humerus, shoulder, foot, elbow, hand, knee, finger, hip, pelvis, toe, chest.

In another embodiment of the present disclosure, a method for classifying fractures and body parts on musculoskeletal X-ray image is disclosed. The method may comprise a step for collecting data using a data collection module. The collected data may correspond to an input X-ray image. The method may further comprise a step for classifying the presence of the fracture and classifying body parts based on the collected data using a classification model and a segmentation model based on artificial intelligence. The method may further comprise a step for analyzing the input X-ray image to recognize a plurality of tags, using the classification model. The plurality of tags may include a fracture and a plurality of body parts. The method may comprise a step for calculating a classification score, corresponding to a recognition of the plurality of tags, using the classification model. The method may comprise a step for dividing the input X-ray image into a plurality of pixels to determine a probability of fracture for each pixel of the plurality of pixels, using the segmentation model. The method may comprise a step for calculating a segmentation score for each pixel of the plurality of pixels, corresponds to a level of probability of fracture using the segmentation model. The method may further comprise a step for generating a fracture score and a body part score based on the classification score and the segmentation score, using the fracture classification module. The method may comprise a step for comparing the fracture score with a threshold value for a fracture to classify presence of fracture and comparing the body part score with a threshold value for each body part to classify body part.

In one embodiment, the method may comprise a step for generating a fracture classification report using a report generation module. The fracture classification report may comprise information of the presence of the fracture.

In another embodiment, the method may comprise a step for training the fracture classification module using a deep learning algorithm.

In yet another embodiment the deep learning algorithm may be a convolutional neural network (CNN).

In yet another embodiment, the method may comprise a step for training the classification model (206) and the segmentation model (207) using one of an EfficientNet, a U-Net, and a combination thereof, based neural network.

In yet another embodiment, the body part may be at least one of the pluralities of body parts comprising ankle, leg, clavicle, femur, fibula tibia, wrist, forearm, humerus, shoulder, foot, elbow, hand, knee, finger, hip, pelvis, toe, chest.

BRIEF DESCRIPTION OF DRA WINGS

The detailed description is described with reference to the accompanying figures. In the Figures, the left-most digit(s) of a reference number identifies the Figure in which the reference number first appears. The same numbers are used throughout the drawings to refer like features and components.

Figure 4:
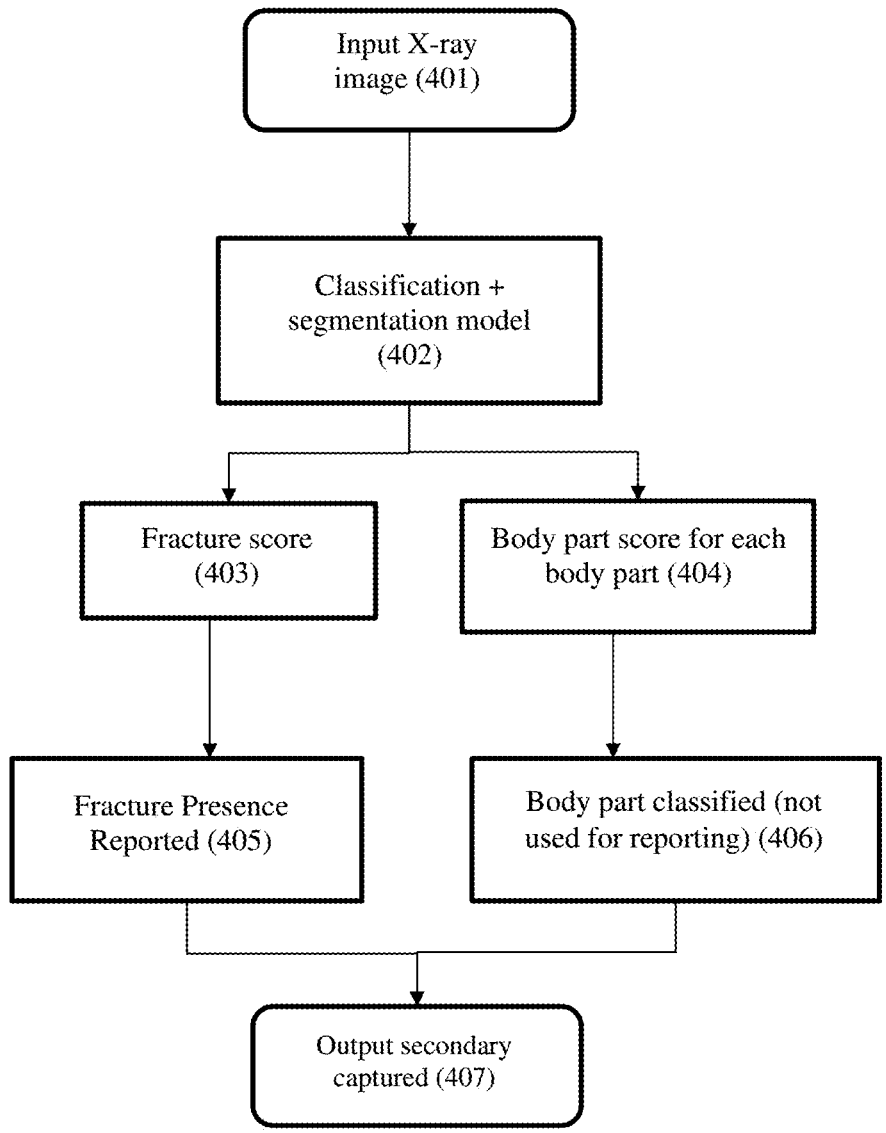
Figure 5:

FIG. 4 illustrates a flowchart describing a working (400) of the system for classifying presence of fracture and classifying body part on musculoskeletal X-ray image, in accordance with an embodiment of the present disclosure, and FIG. 5 illustrates a fracture classification report (500) generated by the report generation module (209) of the system (100), in accordance with an embodiment of the present subject matter.

DETAILED DESCRIPTION

The terms "comprise", "comprising", "include(s)", or any other variations thereof, are intended to cover a non-exclusive inclusion, such that a setup, system or method that comprises a list of components or steps does not include only those components or steps but may include other components or steps not expressly listed or inherent to such setup or system or method. In other words, one or more elements in a system or apparatus preceded by "comprises . . . a" does not, without more constraints, preclude the existence of other elements or additional elements in the system or apparatus.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures, or characteristics may be combined in any suitable manner in one or more embodiments.

The integration of artificial intelligence (AI) techniques in medical healthcare has revolutionized the industry by leveraging advanced algorithms and machine learning to analyse vast datasets, enhance diagnostic accuracy, personalize treatment plans, and streamline administrative processes.

The present disclosure illustrates use of "Artificial intelligence (AI)" in medical image processing. AI is a theory, method, technology and application system that uses a digital computer or a machine controlled by a digital computer to simulate, extend and expand human intelligence, perceive the environment, acquire knowledge, and use knowledge to obtain the best results. In other words, artificial intelligence is a comprehensive technology of computer science, which attempts to understand the essence of intelligence and produce a new kind of intelligent machine that can react in a similar way to human intelligence. Artificial intelligence is to study the design principles and implementation methods of various intelligent machines, so that the machines have the functions of perception, reasoning and decision-making. AI technology is a comprehensive discipline, covering a wide range of fields, including both hardware-level technology and software-level technology. Basic artificial intelligence technologies generally include technologies such as sensors, dedicated artificial intelligence chips, cloud computing, distributed storage, big data processing technologies, operation/interaction systems, and mechatronics. Artificial intelligence software technology mainly includes computer vision technology, speech processing technology, natural language processing technology, and machine learning/deep learning.

The present disclosure illustrates various techniques and configurations that enable the integration and use of machine learning analysis in a data-driven image evaluation workflow. For example, machine learning analysis (such as trained models of image detection of certain medical conditions) may be performed upon medical imaging procedure data produced as part of a medical imaging study. The medical imaging procedure data may include image data captured by an imaging modality, and order data (such as data indicating a request for a radiological image read), each produced to facilitate a medical imaging evaluation (such as a radiology read to be performed by a radiologist or a diagnostic evaluation by another qualified medical professional). For example, machine learning analysis may receive and process images from medical imaging procedure data, to identify trained structures, conditions, and conditions within images of a particular study. The machine learning analysis may result in the automated detection, indication, or confirmation of certain medical conditions within the images, such as the detection of urgent or life-critical medical conditions, clinically serious abnormalities, and other key findings. Based on the result of the machine learning analysis, the medical evaluation for the images and the associated imaging procedure may be prioritized, or otherwise changed or modified. Further, the detection of the medical conditions may be used to assist the assignment of the medical imaging data to particular evaluators, the evaluation process for the medical imaging data, or implement other actions prior to, or concurrent with, the medical imaging evaluation (or the generation of a data item such as a report from such medical imaging evaluation).

As further discussed herein, the machine learning analysis may be provided on behalf of any number of machine learning algorithms and trained models, including but not limited to deep learning models (also known as deep machine learning, or hierarchical models) that have been trained to perform image recognition tasks, particularly for certain types of medical conditions upon medical images of human anatomy and anatomical representations. As used herein, the term "machine learning" is used to refer to the various classes of artificial intelligence algorithms and algorithm-driven approaches that are capable of performing machine driven (e.g., computer-aided) identification of trained structures, with the term "deep learning" referring to a multiple-level operation of such machine learning algorithms using multiple levels of representation and abstraction. However, it will be apparent that the role of the machine learning algorithms that are applied, used, and configured in the presently described medical imaging evaluation may be supplemented or substituted by any number of other algorithm-based approaches, including variations of artificial neural networks, learning-capable algorithms, trainable object classifications, and other artificial intelligence processing techniques.

In one non-limiting embodiment, a system for classifying body parts on musculoskeletal X-ray image, by using a classification model and segmentation model based on an artificial intelligence is disclosed. The system may include a variety of data collected in the form of an input X-ray image. The classification model and segmentation model may be trained using a deep learning algorithm, which enables classification of presence of fracture and the body part from the X-ray image in an intelligent manner. The system may be capable of learning from its operation, improving its fracture classification capabilities over time. The system can learn from each interaction, continuously refining its understanding of individual data and corresponding to classification of presence of fracture and body part.

Figure 1:
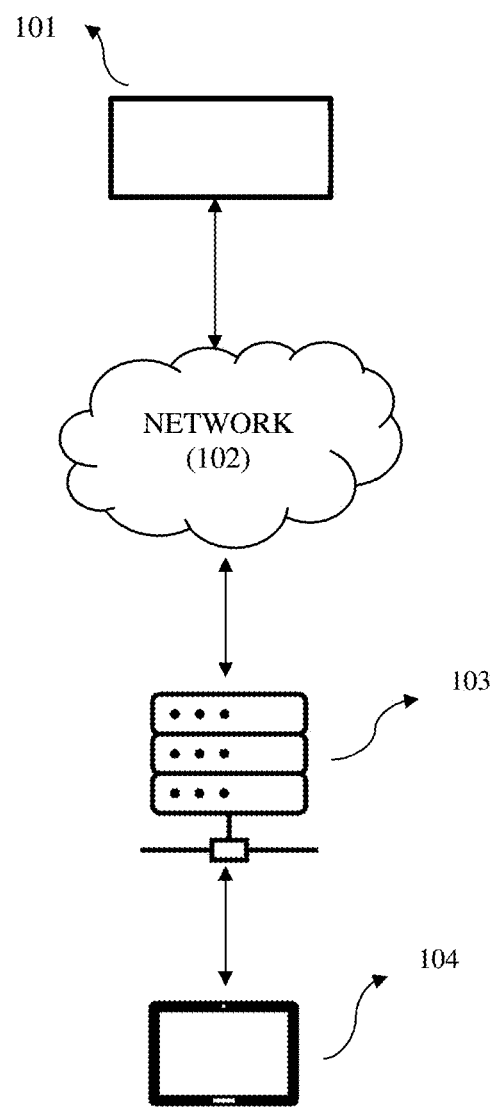
FIG. 1 illustrate a network implementation of system (100) for classifying presence of fracture and classifying body part on musculoskeletal X-ray image, in accordance with an embodiment of a present subject matter.
Figure 2:
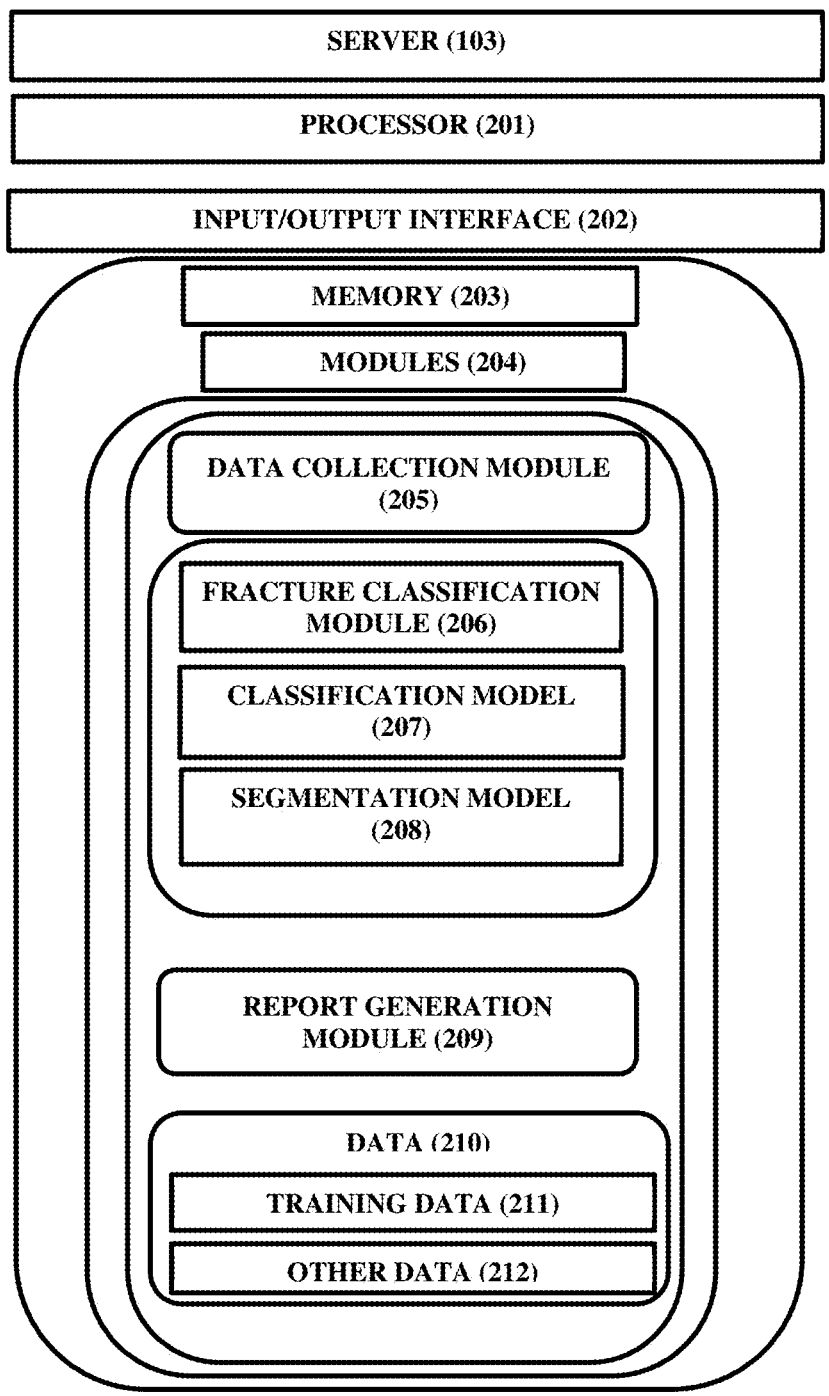
FIG. 2 illustrates a block diagram (200) showing an overview of a server (103) for classifying presence of fracture and classifying body part on musculoskeletal X-ray image, in accordance with the embodiment of the present subject matter.

Now referring to FIG. 1, a block diagram describing a system (100) for classifying body parts on a musculoskeletal X-ray image, is illustrated in accordance with an embodiment of a present subject matter. The system (100) may include data collected in the form of an X-ray image (101). The collected data is coupled with a server (103) via a network (102) connection. Further, considering that the system (100) is implemented on a server (103), it may be understood that the system (100) may be accessed via a variety of computing systems (104). The computing system (104) may correspond to an interface which enables the user to interact with the system (100). The computing system (104) may comprise one selected from a group consisting of a cell phone, personal digital assistant (PDA), laptop computer, stationary personal computer, IPTV remote control, web tablet, laptop computer, pocket PC, a television set capable of receiving IP based video services and mobile IP device. In an embodiment, the system (100) may be configured to receive user data from one or more users, via the computing system (104). The collected data may be in the form of the X-ray image (101) data. In an embodiment, the X-ray image (101) is collected by the server (103) via the network (102), and is transmitted to a memory (203) (as illustrated in FIG. 2) for storage. Further, the functionality and other characteristics of the server (103) would be provided in description of FIG. 2.

In yet another embodiment, the collected data (101), the server (103) and the computing system (104) may communicate with each other via the network (102). In one implementation, the network (102) may be a wireless network, a wired network, or a combination thereof. The network (102) can be implemented as one of the different types of networks, such as intranet, local area network (LAN), wide area network (WAN), the internet, and the like. The network (102) may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network (102) may include a variety of network devices, including routers, bridges, servers, computing devices, storage devices, and the like.

In another embodiment, the network (102) may include any one of the following: a cable network, the wireless network, a telephone network (e.g., Analog, Digital, POTS, PSTN, ISDN, xDSL), a cellular communication network, a mobile telephone network (e.g., CDMA, GSM, NDAC, TDMA, E-TDMA, NAMPS, WCDMA, CDMA-2000, UMTS, 3G, 4G, 5G, 6G), a radio network, a television network, the Internet, the intranet, the local area network (LAN), the wide area network (WAN), an electronic positioning network, an X.25 network, an optical network (e.g., PON), a satellite network (e.g., VSAT), a packet-switched network, a circuit-switched network, a public network, a private network, and/or other wired or wireless communications network configured to carry data.

The system (100) can be implemented using hardware, software, or a combination of both, which includes using where suitable, one or more computer programs, mobile applications, or "apps" by deploying either on-premises over the corresponding computing terminals or virtually over cloud infrastructure. The system (100) may include various micro-services or groups of independent computer programs which can act independently in collaboration with other micro-services. The system (100) may also interact with a third-party or external computer system. Internally, the system (100) may be the central processor of all requests for transactions by the various actors or users of the system. a critical attribute of the system (100) is that it can concurrently and instantly complete an online transaction by a system user in collaboration with other systems.

Now, referring to FIG. 2, a block diagram (200) showing an overview of the server (103) for classifying presence of fracture and body parts on musculoskeletal X-ray image (101), is illustrated in accordance with an embodiment of a present subject matter. The server (103) includes a processor (201), an input/output (I/O) interface (202), and the memory (203). The processor (201) is coupled with the memory (203). The processor (201) is configured to execute programmed instructions stored in the memory (203). The processor, in one embodiment, may comprise a standard microprocessor, microcontroller, central processing unit (CPU), distributed or cloud processing unit, state machines, logic circuitries, and/or any devices that manipulate signals based on operational instructions and/or other processing logic that accommodates the requirements of the present invention. Further, the I/O interface (202) is an interface to other components of the server (103) and the system (100). The I/O interface (202) may include a variety of software and hardware interfaces, for example, a web interface, a graphical user interface, and the like. The I/O interface (202) may allow the system (100) to interact with the user directly or through the computing devices (104). Further, the I/O interface (202) may enable the system (100) to communicate with other computing devices, such as web servers and external data servers (not shown). The I/O interface (202) can facilitate multiple communications within a wide variety of networks and protocol types, including wired networks, for example, LAN, cable, etc., and wireless networks, such as WLAN, cellular, or satellite. The I/O interface (202) may include one or more ports for connecting a number of devices to one another or to another server. In one embodiment, the I/O interface (202) allows the server (103) to be logically coupled to other computing systems (104), some of which may be built in. Illustrative components include tablets, mobile phones, scanner, printer, wireless device, etc. Further, the processors (201) can read data from various entities such as memory (203) or I/O interface (202). The processor's (201) primary functions encompass data acquisition, wherein it gathers X-ray image (101). Following this, the collected data undergoes analysis through specialized modules, and the system (100) determines a fracture and classify body part. Ultimately, it generates an output, which typically includes a diagnosis or evaluation on the fractures and body parts, informed by the comprehensive analysis of the X-ray image. The memory (203) may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, magnetic tapes, memory cards, virtual memory and distributed cloud storage. The memory (203) may be removable, non-removable, or a combination thereof. The memory (203) may include routines, programs, objects, components, data structures, etc., which perform particular tasks or implement particular abstract data types. The memory (203) may include programs or coded instructions that supplement applications and functions of the system (100). In one embodiment, the memory (203), amongst other things, serves as a repository for storing data processed, received, and generated by one or more of the programs or the coded instructions. In yet another embodiment, the memory (203) may be managed under a federated structure that enables adaptability and responsiveness of the server (104). The memory further may include various modules (204) namely a data collection module (205), a fracture classification module (206), and a report generation module (209). The fracture classification module (206) may further include a classification model (207) and a segmentation model (208). In one embodiment, the server (103) utilizes the processor (201) for executing the various modules (204) stored in the memory (203).

The data collection module (205) is configured to collect data corresponding to the input X-ray image (101). In an exemplary embodiment, the input X-ray image may correspond to a part of the body. The data collected by the data collection module (205) is utilized by the fracture classification module (206) for classifying the fractures and body part. In one exemplary embodiment, the fracture classification module (206) is implemented by using an artificial intelligence-based system. In one implementation, the fracture classification module (206) may be configured to analyze the input X-ray image (101) by using the artificial intelligence-based system. Further, the fracture classification module (206) may generate an output regarding classification of fractures and body parts in the X-ray image. In an embodiment, the fracture classification module (206) may utilize the processor (201) to implement the artificial intelligence-based system. The artificial intelligence-based system corresponds to a combination of the classification model (207) and the segmentation (208). In a related implementation, the fracture classification module (206) is configured to train the artificial intelligence-based system, including the classification model (207) and the segmentation model (208), using the X-ray image (101).

The fracture classification module (206) may include, classification model (207), with the help of processor (201), is configured to analyse the input X-ray image (101) to classify the presence of fracture and body parts of musculoskeletal X-ray image (101) based on the collected data (210). In one embodiment, the collected data may be training data (211). In one embodiment, the classification model (207) may be trained using the training data (211). In one exemplary embodiment, the training data may comprise, but not limited to, a plurality of tags of the items present in each pixel of the X-ray image, a threshold value for a fracture, a threshold value for each body part of a plurality of body parts. In one embodiment, the plurality of body parts may comprise of ankle, leg, clavicle, femur, fibula tibia, wrist, forearm, humerus, shoulder, foot, elbow, hand, knee, finger, hip, pelvis, toe, chest. The classification model (207) may be trained to recognize the plurality of tags. Further, the classification model (207) may provide multiple tags, including, but not limited to a fracture score, and few anatomies scores. Further, the classification model (207) may be trained to calculate a fracture score and a body part score.

Further, the classification model (207) may be trained to calculate a classification score, corresponding to the recognition of the plurality of tags. This capability of tag recognition and scoring adds a layer of precision and depth to the system's fracture classification capabilities, enhancing diagnostic accuracy in the medical context.

In one embodiment, the classification model (207) may be trained using deep learning (may also be called as deep learning techniques) which is a part of a machine learning family.

The deep learning techniques may comprise multiple layers in a network. The deep learning techniques may comprise a Convolutional Neural Network (CNN) technique. The deep learning techniques may use a trained data model for an operation. The trained data model comprises historical information, musculoskeletal X-rays of a set of patients, medical history of the set of patients, and the information associated with the nodules for the set of patients. It may be noted that the trained data model may be trained using a continuous learning approach like Reinforcement Learning techniques. The training data (211) model may correspond to data learned by the system to operate efficiently. The training data (211) model may enable an accurate operation of the deep learning techniques. In an example, imagine a medical AI system that scans an X-ray image of a broken bone. It first collects the X-ray data, then uses AI to classify the fracture and body parts by recognizing specific features and calculating scores.

In one exemplary embodiment, the classification model (207) and the segmentation, configured for training and collecting the trained data of 450,000 X-rays including different body parts. The dataset was meticulously labeled by expert radiologists, ensuring precise and dependable ground truth annotations for training.

In another exemplary embodiment, the classification model (207) and the segmentation model (208) trained to provide output classification labels and binary segmentation masks for fractures.

In another exemplary embodiment the output generated by the classification model (207) and the segmentation model (208) is described as a secondary output (407) captured. In one exemplary embodiment, the classification model (207) and the segmentation model (208) trained using Unet++ based algorithm for the segmentation task keeping EfficientNetv2 as the backbone. EfficientNetv2 is a family of convolutional neural network architectures designed for efficient and scalable image classification. It introduces compound scaling to balance model depth, width, and resolution, achieving high accuracy with fewer parameters. UNet++ is the convolutional neural network architecture commonly used for semantic segmentation tasks. It combines an encoder-decoder structure with skip connections to capture global and local features. UNet++ has been widely adopted and achieved state-of-the-art results in various medical imaging and computer vision applications.

Ground truth masks are annotated by a team of expert radiologists over a span of one year to draw free-hand boundaries across fractures on the X-rays and mark the labels as positive.

The present system and method collected 550 X-ray scans and used 400 thousand for training and the remaining for validation. The input X-ray may contain multiple fractures consisting of frontal, lateral, and oblique views.

The classification model (207) may use Cross entropy loss for the classification. It measures the dissimilarity between the predicted probability distribution and the true label distribution, encouraging the model to minimize the difference between them.

The segmentation model (207) may use Dice-BCE loss the segmentation task. The Dice BCE (Binary Cross-Entropy) loss combines the Dice coefficient loss and the Binary Cross-Entropy loss. The former computes dissimilarity between the predicted and ground truth segmentation masks, encouraging accurate localization and segmentation by maximizing their overlap.

The classification model (207) and the segmentation model (208) are trained on three GPUs (NVIDIA Geforce RTX 3090) for 130 epochs with a batch size of 10000, and Stochastic Gradient Descent (SGD) optimizer. The OneCycleLR, a learning rate scheduler is used to optimize the training process by dynamically adjusting the learning rate during different stages of training. It involves gradually increasing and then decreasing the learning rate within a single training cycle. This technique aims to improve convergence speed, prevent overfitting, and achieve better generalization performance.

In one embodiment, the classification model (207) may analyse the input X-ray image (101) to recognize a plurality of tags present in the input X-ray image. Further, the classification model (207) may be configured for calculating the fracture score and the body part score corresponds to the recognition of the plurality of tags. In one embodiment, the classification model (207) may correspond to the deep learning algorithm. In one exemplary embodiment, the deep learning algorithm may be a convolutional neural network (CNN).

In one embodiment, the classification model (207) may be configured to calculate classification score for each tag of the plurality of tags.

Now referring to FIGS. 2 and 4, the fracture classification module (206) may comprise segmentation model (208). The segmentation model (208) may be configured to perform a series of steps driven by artificial intelligence. Firstly, the segmentation model (208) may be configured for dividing the input X-ray image into the plurality of pixels to determine the probability of fracture for each pixel of the plurality of pixels, using the segmentation model. Further, the segmentation model (208) may be configured for calculating a segmentation score for each pixel of the plurality of pixels, corresponding to the probability of fracture. In one exemplary embodiment, the segmentation model (208) may process the input X-ray image with a resolution of 1080×920 pixels. The segmentation model (208) may calculate a numeric score for each pixel of the 1080×920 within the range of 0 to 1.

Furthermore, the calculated score of each pixel may be compared with corresponding threshold value. Following this comparison, all pixels for which the calculated score exceeds the threshold value may be employed to generate a binary mask.

Further, the fracture classification module (206) may be configured for generating the fracture score (403) and the body part score (404) based on the classification score and the segmentation score. Furthermore, the fracture score (403) and body part score (404) are determined using the plurality of tags including tag for the fracture score and body part score. Further, the fracture classification module (206) may be configured for comparing the fracture score (403) with a threshold value, thereby classifying the presence or absence of a fracture. Simultaneously, the fracture classification module (206) may be configured for comparing the body part score (404) with threshold values for each pixel/anatomical region. The body part may be at least one of the pluralities of body parts. In essence, the segmentation model (208) based on AI may serve as a powerful diagnostic tool, swiftly identifying fractures and specifying body areas, ensuring efficient and precise medical evaluations and treatment plans.

Further, the report generation module (209) may be configured to generate a fracture classification report. The fracture classification report may comprise information of the presence of fracture.

In one embodiment, the system (100) may generate output as a secondary capture output (404).

Now referring to FIG. 5, the fracture classification report (500) generated by the report generation module (209) is illustrated, in accordance with an embodiment of the present subject matter. The fracture classification report (500) may provide information of presence of fracture as "fracture classified (501)".

In yet another embodiment, the system (100) may enable providing accurate and up-to-date body part classification based on continuously learning from clinical evidence over time and adapting the system (100) accordingly.

Although the present disclosure is explained considering that the system (100) is implemented on a server, it may be understood that the system (100) may be implemented in a variety of computing systems, such as a laptop computer, a desktop computer, a notebook, a workstation, a virtual environment, a mainframe computer, a server, a network server, a cloud-based computing environment. It will be understood that the system (100) may be accessed by multiple users through one or more user devices. In one implementation, the system (100) may comprise the cloud-based computing environment in which the user may operate individual computing systems configured to execute remotely located applications. Examples of the user devices may include, but are not limited to, a portable computer, a personal digital assistant, a handheld device, and a workstation.

Figure 3:
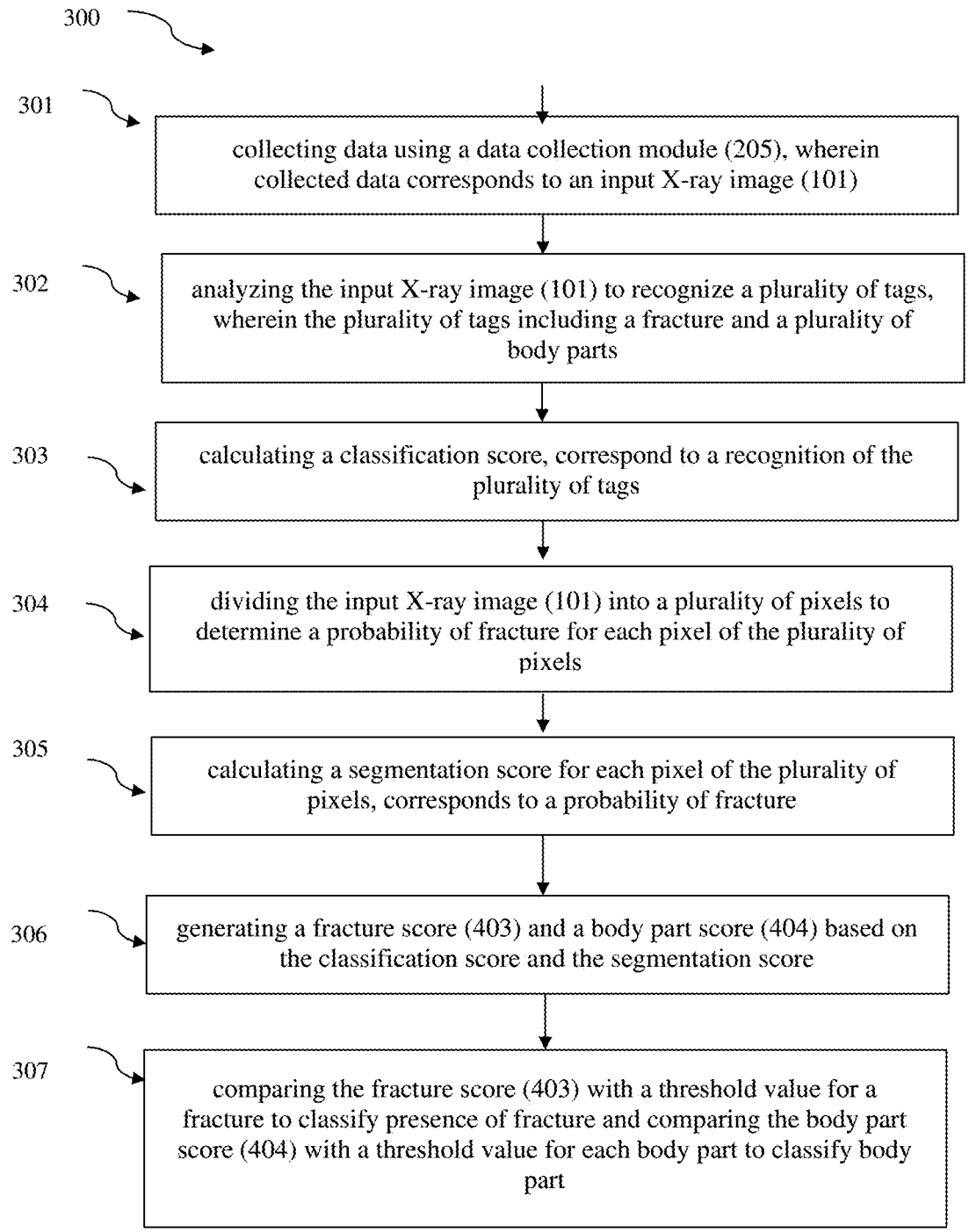
FIG. 3 illustrates a flowchart describing a method (300) for classifying presence of fracture and classifying body part on musculoskeletal X-ray image, in accordance with an embodiment of the present subject matter.

Now referring to FIG. 3, a flowchart describing a method (300) for classifying fractures and body parts on musculoskeletal X-ray image (101), in accordance with an embodiment of the present subject matter. The method (300) is structured as a step-by-step process.

At step (301), the data collection module (205) may be configured for collecting the data corresponding to the input X-ray image.

In one embodiment, the fracture classification module may be configured for classifying the presence of the fracture and body parts based on the collected data using the classification model (207) and the segmentation model (208).

More specifically, at step (302), the classification model (207) based on artificial intelligence may be configured for analyzing the input X-ray image to recognize the plurality of tags. In one embodiment, the plurality of tags may include the fracture and the plurality of body parts.

At step (303), the classification model (207) may be configured for calculating the classification score, corresponding to the recognition of the plurality of tags.

Further, at step (304), the segmentation model (208) based on artificial intelligence may be configured for dividing the input X-ray image into the plurality of pixels to determine the probability of fracture for each pixel of the plurality of pixels.

At step (305), the segmentation model (208) may be configured for calculating the segmentation score for each pixel of the plurality of pixels, corresponding to the probability of fracture.

At step 306, the fracture classification module (206) may be configured for generating a fracture score (403) and a body part score (404) based on the classification score and the segmentation score.

In one embodiment, the fracture score (403) and body part score (404) are determined using the plurality of tags including the fracture score and body part score.

At step 307, the fracture classification module (206) may be configured for comparing the fracture score (403) with the threshold value of the fracture to classify presence of the fracture and comparing the body part score (404) with the threshold value for each body part to classify body part.

In one embodiment, the performance of the system and method is evaluated using performance metrics such as an Area Under Curve (AUC), an Average Precision (AP), a sensitivity, and a specificity.

In one exemplary embodiment, the training dataset for the system (100) and method (300) comprises 10,643 studies comprising 20,327 images, with posteroanterior and lateral projections. In the complete set of 20,327 scans, the present system and method has achieved an area under the curve (AUC) of 0.8593 (CI 0.8544-0.8642), an average precision (AP) of 0.9315, and a sensitivity and specificity of 0.7918. For female pediatric scans, our model achieved an AUC of 0.8522 (CI 0.8442-0.8602), an AP of 0.9053, and a sensitivity and specificity of 0.781. Similarly, for male pediatric scans, our model achieved an AUC of 0.8596 (CI 0.8532-0.8661), an AP of 0.9451, and a sensitivity and specificity of 0.7934. The achieved AUC, AP, sensitivity, and specificity values indicate the robust performance of the system, particularly in distinguishing fractures in different genders. The deep neural network was trained and tested on these x-ray scans for the classification and segmentation of fractures in eight body parts: leg, femur, wrist, fibula-tibia, shoulder, humerus, hand, and forearm. In this study, a random sample of 9600 x-ray scans from the test dataset was selected, comprising 1200 images for each body part. Further, the standard performance evaluation metrics are utilized to report the performance of the deep learning system.

In yet another embodiment, the system and method based on a deep learning algorithm has achieved an overall AUC of 0.9517 (C.I. 0.9469-0.9564), a sensitivity and specificity of 0.8842 and 0.9232 respectively, for fracture classification on all the body parts. The top two highest performances were achieved for femur and wrist fractures. The femur fractures were classified with an AUC of 0.9653, a sensitivity of 0.91, and a specificity of 0.90 while the wrist fractures with an AUC of 0.9558, a sensitivity of 0.89, and a specificity of 0.92. The present system and method has obtained greater than 0.94 AUC for all body parts classification with leg classified at AUC, sensitivity, and specificity of 0.9706, 0.91, and 0.91, respectively.

EXAMPLE

Normal scenario (unaided): The process often begins with the patient reporting symptoms or experiencing pain in a specific area. The healthcare providers then start by taking a detailed medical history, asking questions about the nature of the injury, the mechanism of injury (e.g., a fall, sports accident), and any associated symptoms. Further, the healthcare providers then perform a physical examination of the affected area. They may assess for swelling, tenderness, deformity, and any signs of bruising. The patient may also be asked to move the injured limb or area to evaluate the range of motion and pain.

X-rays are a standard and non-invasive method for classifying fractures. In this case, a radiologic technologist or radiologist will take X-ray images of the injured area to visualize the bones and identify any fractures. Once the X-ray images are available, the healthcare provider will assess them for signs of a fracture, such as a visible break, displacement, or abnormal alignment of the bones. Based on the findings from the manual physical examination and X-ray results, the healthcare provider will make a diagnosis. Using Disclosed System (Aided): The mentioned technology could be used to assist in classifying fractures and body parts. The healthcare professionals would input the X-ray image of the affected body part, and any other relevant clinical data into the device. The AI model would analyse the X-ray image to classify any abnormalities, such as fractures, and body parts.

The system would input the X-ray image and determine the fracture score and the body part score for each body part by the classification model and the segmentation model, providing additional diagnostic support to the healthcare professional. Based on the results, the healthcare professional could then make a more informed diagnosis and recommend appropriate treatment options.

Overall, the system could help healthcare professionals in making a more accurate and timely diagnosis of fractures and affected body parts, leading to better patient outcomes and potentially reducing the overall cost of care.

The system (100) as disclosed in the disclosure may help in clinical decision support system for classifying fractures and body part on musculoskeletal X-ray in the following advantages:

Accurate Diagnosis of fractures and body part: The AI based fracture classification improves fracture classification accuracy, reducing the likelihood of misdiagnosis.

Comprehensive Analysis: Recognizes multiple tags in X-ray images, providing a detailed understanding of the fracture's characteristics.

Efficient use of healthcare resources: The system can help to streamline reducing the time and resources required to fracture classification. By providing accurate and timely classification, the system can help to reduce the need for additional testing and treatments, which can be costly and time-consuming.

Personalized Reports: Generates fracture classification reports, aiding in treatment decisions.

Adaptability: Can be trained and improved with more data, adapting to evolving medical knowledge and image variations.

Advanced Technology: Utilizes deep learning models, including convolutional neural networks (CNNs) and U-Net based networks, for robust fracture identification.

Customizable Thresholds: Allows customization of threshold values for each fracture part, accommodating varying fracture types and complexities.

Overall, the system can help to solve a range of problems related to diagnosing and classifying fractures and body parts, improving accuracy and efficiency of the clinical decision-making process and enhancing patient outcomes.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

The foregoing description shall be interpreted as illustrative and not in any limiting sense. A person of ordinary skill in art would understand that certain modifications could come within the scope of this disclosure.

The embodiments, examples and alternatives of the preceding paragraphs or the description and drawings, including any of their various aspects or respective individual features, may be taken independently or in any combination. Features described in connection with one embodiment are applicable to all embodiments unless such features are incompatible.

The invention claimed is:

1. A system (100) for classifying fractures and body parts on musculoskeletal X-ray image (101), characterized in that, the system (100) comprises:
   a memory (203);
   a processor (201) coupled with the memory (203), wherein the processor (201) is configured to execute programmed instructions stored in the memory (203);
   a data collection module (205), wherein data collected by the data collection module (205) corresponds to an input X-ray image (101);
   a fracture classification module (206) for classifying the presence of fracture and body parts based on the collected data, using a classification model (207) and a segmentation model (208) based on artificial intelligence, wherein the classification model (207) and the segmentation model (208) carried out by the processor (201);

wherein the classification model (207) is configured to perform steps of:
  analyzing the input X-ray image (101) to recognize a plurality of tags, wherein the plurality of tags including one or more fractures and a plurality of body parts;
  calculating a classification score, correspond to recognition of the plurality of tags;
wherein the segmentation model (208) is configured to perform steps of:
  dividing the input X-ray image (101) into a plurality of pixels to determine a probability of fracture for each pixel of the plurality of pixels;
  calculating a segmentation score for each pixel of the plurality of pixels, corresponds to a level of the probability of fracture;
wherein the fracture classification module (206) is configured for:
  generating a fracture score (403) and a body part score (404) based on the classification score and the segmentation score; and
  comparing the fracture score (403) with a threshold value for a fracture to classify presence of fracture and comparing the body part score (404) with a threshold value for each body part to classify body part.

2. The system (100) as claimed in claim 1, comprises a report generation module (209) to generate a fracture classification report (500), wherein the fracture classification report (500) comprises information of the presence of fracture (501).

3. The system (100) as claimed in claim 1, wherein the fracture classification module (206) is configured to train the classification model (207) and the segmentation model (208) using data collected by the data collection module (205), wherein the fraction classification module (206) corresponds to a deep learning algorithm, wherein the deep learning algorithm is a convolutional neural network (CNN).

4. The system (100) as claimed in claim 1, wherein the classification model (207) and the segmentation model (208) are trained using one of an EfficientNet, a U-Net, and a combination thereof, based neural network.

5. The system (100) as claimed in claim 1, wherein the body part is at least one of the pluralities of body parts comprising ankle, leg, clavicle, femur, fibula tibia, wrist, forearm, humerus, shoulder, foot, elbow, hand, knee, finger, hip, pelvis, toe, chest.

6. A method (300) for classifying fractures and body parts on musculoskeletal X-ray image, characterized in that, the method (300) comprises:
  collecting (301) data using a data collection module (205), wherein collected data corresponds to an input X-ray image (101);
  classifying the presence of the fractures and body parts based on the collected data using a classification model (207) and a segmentation model (208) based on artificial intelligence using a fracture classification module (206);
  wherein the classification model (207) performs the following steps:
    analyzing (302) the input X-ray image (101) to recognize a plurality of tags, wherein the plurality of tags including one or more fractures and a plurality of body parts;
    calculating (303) a classification score, correspond to a recognition of the plurality of tags;
  wherein the segmentation model (207) is configured to perform steps of:
    dividing (304) the input X-ray image (101) into a plurality of pixels to determine a probability of fracture for each pixel of the plurality of pixels;
    calculating (305) a segmentation score for each pixel of the plurality of pixels, corresponds to a probability of fracture;
  wherein the fracture classification module (206) is configured to perform steps of:
    generating a fracture score (403) and a body part score (404) based on the classification score and the segmentation score; and
    comparing the fracture score (403) with a threshold value for a fracture to classify presence of fracture and comparing the body part score (404) with a threshold value for each body part to classify body part.

7. The method (300) as claimed in claim 6, comprises a step for generating a fracture classification report (500) using a report generation module (209), wherein the fracture classification report (500) comprising an information of the presence of fracture (501).

8. The method (300) as claimed in claim 6, comprises a step for training the classification model (207) and the segmentation model (208) using data collected by the data collection module (205), wherein the fracture classification module (206) corresponds to a deep learning algorithm, wherein the deep learning algorithm is a convolutional neural network (CNN).

9. The method (300) as claimed in claim 6, comprises a step for training the classification model (206) and the segmentation model (207) using one of an EfficientNet, a U-Net, and a combination thereof, based neural network.

10. The method (300) as claimed in claim 6, wherein the body part is at least one of the plurality of body parts comprising ankle, leg, clavicle, femur, fibula tibia, wrist, forearm, humerus, shoulder, foot, elbow, hand, knee, finger, hip, pelvis, toe, chest.

* * * * *